E. H. Ashcroft,
Steam Gage Cock.
Nº 67,479. Patented Aug. 6, 1867.
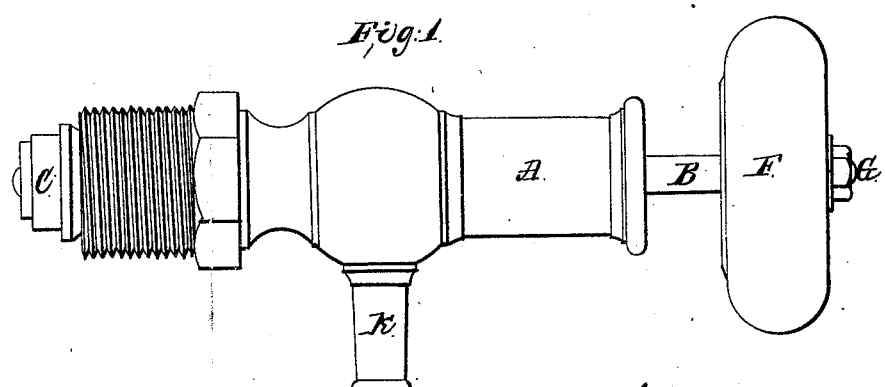
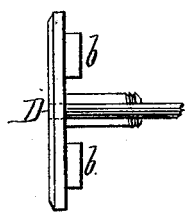
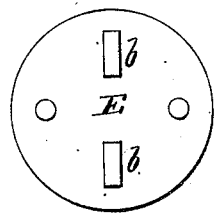
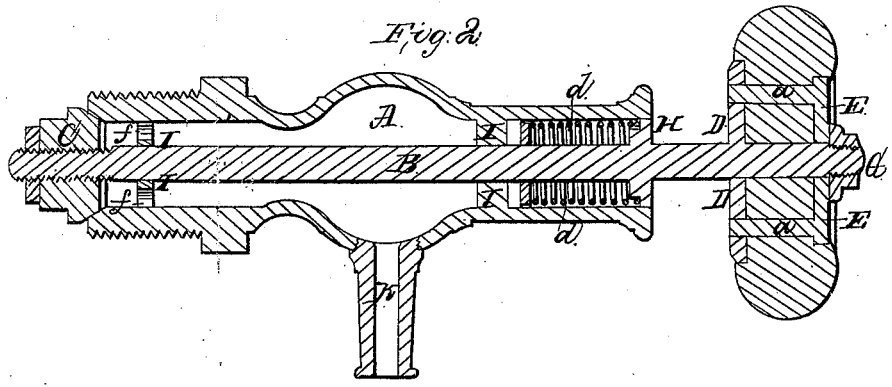
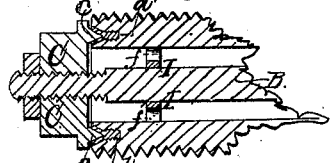
Witnesses:
Jas. L. Combs
J. P. Theodore Lang
Inventor:
E. H. Ashcroft
by his atty J. S. Fahnestock

UNITED STATES PATENT OFFICE.

E. H. ASHCROFT, OF LYNN, MASSACHUSETTS.

IMPROVEMENT IN STEAM-GAGE COCKS.

Specification forming part of Letters Patent No. 67,479, dated August 6, 1867.

*To all whom it may concern:*

Be it known that I, E. H. ASHCROFT, of Lynn, in the county of Essex and State of Massachusetts, have invented certain new and useful Improvements in Steam-Boiler Gage-Cocks; and I do hereby declare that the following is a full, clear, and exact description of the same, reference being had to the accompanying drawings, in which—

Figure 1 is an elevation of my improved gage-cock. Fig. 2 is a section of the same. Figs. 3 and 4 show a modification of the device for securing the handle to the valve-stem; and Fig. 5 is a modification of the valve.

My invention relates to that class of steam-boiler gage-cocks in which the handles are made of wood; and its object is to provide an efficient means of securing said handles to the valve-rod, so that in case the wood be warped or otherwise injured by heat from the boiler, they will still be held rigidly to the valve-rod.

To enable others to make and use my invention, I will proceed to describe it by reference to the accompanying drawings.

In the said drawings, A is the gage-cock proper, B the valve-stem, and C the valve. Near the top of the valve-stem, and permanently attached thereto, is a circular plate or disk, D, perforated with two holes for the reception of the bolts $a\ a$ of the disk E. These pins are either cast with the disk E, or securely attached thereto, and pass through the handle F.

The extreme upper end of the valve-stem is screw-threaded, upon which works a small nut, G, for the purpose of holding the handle tightly between the disks D and E. Figs. 3 and 4 show a modification of this device, the disks D and E each being provided with two shoulders, $b\ b$, in addition to the pins and holes shown in Fig. 2, and fit in recesses in the handle F. The said handle is cut away on both its upper and lower side, to form seats for the disks D and E. The upper part of the gage-cock proper is formed into a chamber, closed at top by the disk H, securely attached to the valve-rod B, and contains a spiral spring, $d$, for the purpose of actuating the valve C.

The valve may be made of any ordinary or suitable construction. In Fig. 5 I have shown it provided with a flange, $c$, fitting into a disk, $d'$, of soft metal or rubber, inserted in the bottom of the gage-cock proper. I I are the bearings for the valve-stem. K is the nozzle of the gage-cock.

Having thus described my invention, what I claim as new, and desire to secure by Letters Patent of the United States, is—

1. I claim the handle F, constructed in the manner substantially as shown and described, and for the purposes set forth.

2. The combination of handle F, stem B, disk H, spring $d$, gage-cock A, bearings I I, and valve C, constructed, arranged, and operated in the manner substantially as shown and described.

E. H. ASHCROFT.

Witnesses:
EDWIN J. WRIGHT,
CHARLES E. ASHCROFT.